United States Patent [19]

Harrell

[11] 3,861,983
[45] Jan. 21, 1975

[54] FILM POSITIONING APPARATUS
[75] Inventor: Melvin R. Harrell, Kansas City, Mo.
[73] Assignee: Phillips Petroleum Company, Bartlesville, Okla.
[22] Filed: Feb. 12, 1973
[21] Appl. No.: 332,030

[52] U.S. Cl. .................. 156/361, 53/51, 156/69, 156/359, 156/367, 156/552, 156/583
[51] Int. Cl. .................. B29c 27/06, B65h 25/06
[58] Field of Search .......... 156/361, 359, 367, 552, 156/583, 69; 53/51

[56] References Cited
UNITED STATES PATENTS

| 3,140,573 | 7/1964 | Buttolph | 53/51 |
| 3,238,691 | 3/1966 | Miller et al. | 53/51 |
| 3,652,363 | 3/1972 | Kinslow, Jr. | 156/361 |

Primary Examiner—Charles E. Van Horn
Assistant Examiner—Basil J. Lewris

[57] ABSTRACT

Apparatus for adjusting a printed portion of a film relative to a container to which the film is sealed to form a cover for the container.

4 Claims, 2 Drawing Figures

PATENTED JAN 21 1975 3,861,983

FILM POSITIONING APPARATUS

It is common practice in the packaging industry to employ plastic containers which have a film sealed across the top. The film can be sealed to the container by a heating element which engages the film when it is positioned across the top of the container. In order to minimize handling problems, the film is usually supplied as a continuous sheet which it unrolled from a reel and positioned across the top of the containers. The film is often printed to describe the contents of the package or to provide other information. Due to the fact that the film may be stretched in operation and because individual labels may not always be printed precisely on the film strip, it is important to provide apparatus for centering individual segments of the film correctly on the containers.

In U.S. Pat. No. 3,652,363 there is disclosed apparatus which is capable of accomplishing this result. The apparatus therein disclosed employs a movable tucker bar which serves to displace the film relative to the containers as may be necessary to secure proper alignment. In accordance with the present invention, improved apparatus is provided of the general type disclosed in the patent. The apparatus of the present invention utilizes fewer electrical circuit components to control movement of the tucker bar.

In the accompanying drawing.

Figure 1:
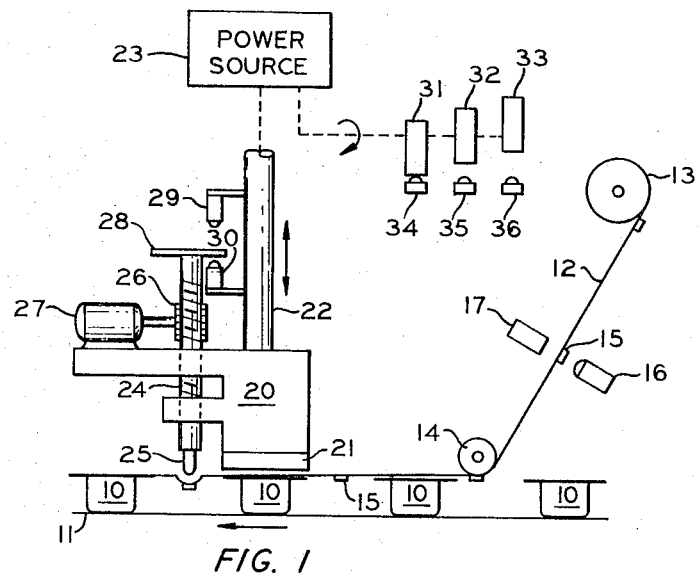
FIG. 1 is a schematic representation of the mechanical components of the film positioning apparatus of this invention.

Referring now to the drawing in detail and to FIG. 1 in particular, a plurality of containers 10 are mounted in spaced relationship on a conveyor 11. The conveyor is actuated by suitable drive equipment, not shown, so that the individual containers are advanced intermittently to the cover sealing equipment. The containers are covered by a segment of film 12 which is withdrawn from a supply reel 13. A guide reel 14 serves to direct the film to the tops of the containers as they are moved by conveyor 11.

Film 12 is normally printed with individual labels to be located on the containers. A plurality of sensing means, schematically illustrated in the drawing as elements 15, are located on the film between adjacent labels. These sensing means can be opaque sections of the film which serve to block a beam of light. As such, they do not actually extend beyond the plane of the film. However, other types of sensing means can be utilized, such as a magnetic area to actuate a proximity switch, or a hole in the film to be engaged by a slide contact switch. In the illustrated embodiment employing opaque sections, a light source 16 and a photocell 17 are positioned on opposite sides of the film so that light transmitted therebetween is blocked when an opaque section 15 is located between elements 16 and 17.

A sealing head 20, which is provided with a heating element 21 on the lower surface thereof, is secured to a rod 22 for reciprocal movement when actuated by a power source 23. When the sealing head is lowered, heating element 21 engages the film about the flanged upper surface of a container to seal the film to the container. Power source 23 and conveyor 11 are synchronized so that sealing head 20 is lowered each time a container 10 is advanced by conveyor 11 to a position beneath the sealing head.

A threaded rod 24 is carried by sealing head 20 so that rotation of the rod moves a tucker bar 25 downwardly or upwardly, depending on the direction of rotation of rod 24. Bar 25 is provided with a blunt lower surface which preferably is of such configuration as to extend across the width of the film. This bar can be attached to rod 24 by suitable guide means, not shown in detail, so that the bar does not rotate, but rather moves up and down as rod 24 is rotated. Rod 24 is engaged by a worm gear 26 which is driven by a motor 27 that is carried by sealing head 20. A disk 28 extends from rod 24 so that it can engage respective limit switches 29 and 30.

Three cams 31, 32 and 33 are rotated by power source 23 so as to engage respective switches 34, 35 and 36. The rotation of the cams is synchronized with vertical movement of the sealing head in the manner to be described.

Figure 2:
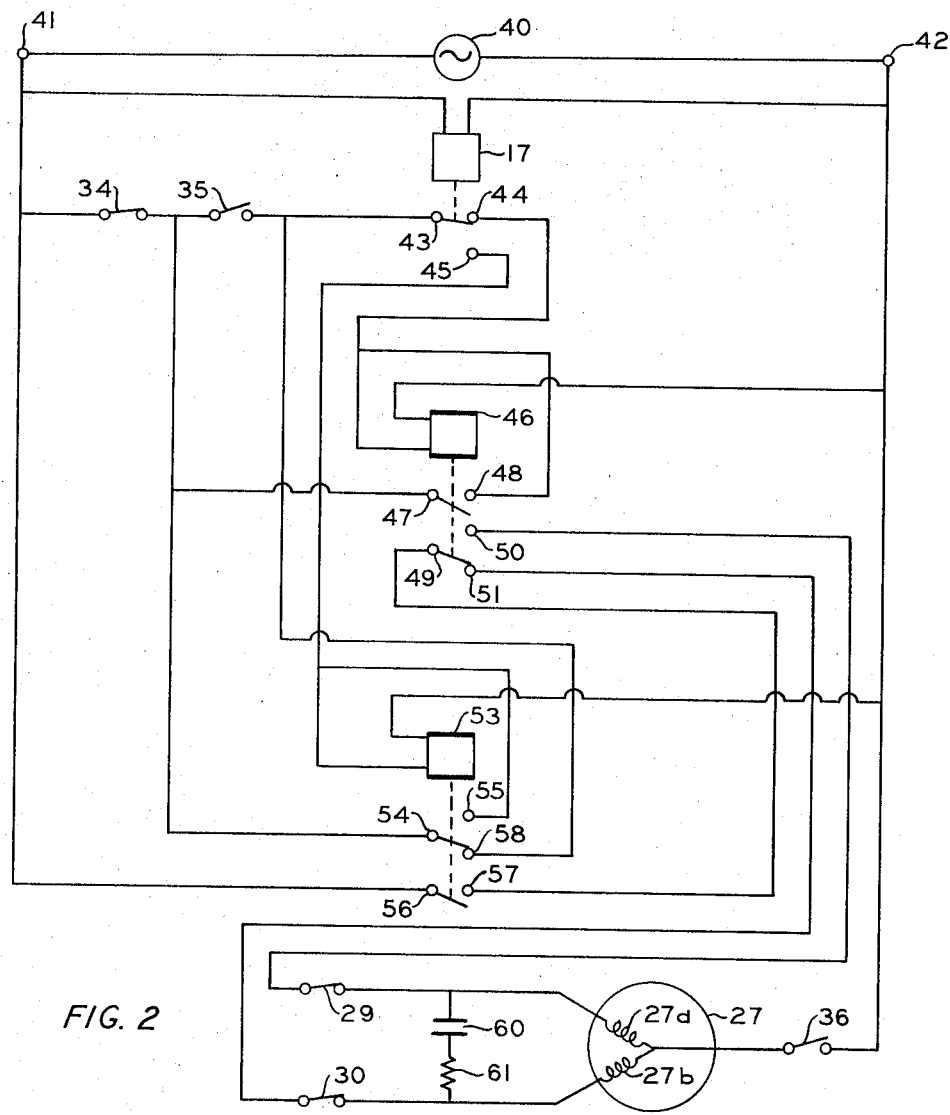
FIG. 2 is a schematic circuit drawing of the electrical equipment associated with the apparatus of FIG. 1.

The electrical components of the control system of this invention are illustrated schematically in FIG. 2. The circuit of FIG. 2 is energized by a current source 40 which is connected across power terminals 41 and 42. Photocell 17 is connected between these power terminals and serves to actuate a switch 43 which selectively engages terminals 44 and 45. The photocell is arranged so that switch 43 is moved into engagement with terminal 44 when an opaque element 15 is positioned between light source 16 and photocell 17. Switches 34 and 35 are connected in series relationship between terminal 41 and switch 43. Terminal 44 is connected to the first terminal of a relay coil 46, the second terminal of which is connected to terminal 42. When relay coil 46 is energized, a switch 47 is moved into engagement with a terminal 48 and a switch 49 is moved into engagement with a terminal 50. Switch 49 engages a terminal 51 when relay coil 46 is deenergized. Terminal 48 is connected to terminal 44, and switch 47 is connected to the junction between switches 34 and 35.

Terminal 45 is connected to the first terminal of a relay coil 53, the second terminal of which is connected to terminal 42. When relay 53 is energized, a switch 54 is moved into engagement with a terminal 55 and a switch 56 moves into engagement with a terminal 57. Switch 54 engages a terminal 58 when relay coil 53 is deenergized. Terminal 55 is connected to terminal 45, and swtich 54 is connected to the junction between switches 34 and 35. Terminal 58 is connected to switch 43. Switch 56 is connected to terminal 41, and terminal 57 is connected to switch 49.

Terminal 50 is connected by switch 29 to the first coil 27a of reversible motor 27. Terminal 51 is connected by switch 30 to the second coil 27b of motor 27. The second ends of these two coils are connected by switch 36 to terminal 42. A capacitor 60 and a resistor 61 are connected in series relationship between coils 27a and 27b.

As illustrated in FIG. 1, film 12 unreels from the supply roll 13. The film is positioned initially across a container on the conveyor so that a label is in proper registration with the container, and sealing head 20 is brought down to seal the film to the container flange. As the tray is moved forward by conveyor 11, the film is unreeled so as to extend across the following containers to be sealed. The sealed containers are separated by a film cutter, not shown, downstream of the sealing head.

Light source 16 and photocell 17 are positioned so that the light beam is blocked by an opaque element 15 when the film is properly registered on a container beneath sealing head 20. When the film is so aligned, photocell 17 moves switch 43 into engagement with terminal 44 as illustrated in FIG. 2. Switch 34 is closed when the sealing head is moved down so that a circuit is completed from terminal 41 through switch 34 and switch 54 (relay coil 53 being deenergized) to switch 43. The location of switch 43 in engagement with terminal 44, resulting from photocell 17 being actuated, serves to energize relay coil 46. The closure of switch 47 results in the relay being locked in the energized position. During the time that the sealing head is in a down position, switch 35 is closed momentarily to actuate the film positioning mechanism. If the film is in proper registration, as thus far described, no action takes place on closure of switch 35 because switch 43 is out of engagement with terminal 45 to prevent relay coil 53 from being energized. After the sealing head moves upwardly, switch 36 is closed for a short time interval. This permits motor 22 to be energized in the manner to be described. However, the motor is not energized when the film is properly aligned because relay coil 53 is not energized. Prior to the end of a complete cycle of operation, switch 34 is opened to reset the control system.

It will now be assumed that the film has become retarded so that an opaque segment 15 has not blocked the lights to photocell 17 at the time conveyor 11 is stationary and the sealing head is moved down. Switch 43 remains in contact with terminal 45 at the time switch 35 is closed to actuate the control system. This results in relay coil 53 being energized instead of relay coil 46. The movement of switch 54 into engagement with terminal 55 results in relay coil 53 being locked in the energized position. When switch 36 is closed, motor winding 27b will receive current from the circuit which is completed through switches 56, 49 and 30. The shape of the cam 33 which closes switch 36 determines the length of time that motor 27 drives to move tucker bar 25 downwardly. The downward movement of bar 25 displaces the film downwardly with each operation of the sealing head so as to advance the film in order to restore it to proper registration. If the tucker bar should be driven downwardly to the lowermost desired limit, disk 28 opens limit switch 30 to terminate motor rotation.

It will now be assumed that the film is out of alignment such that opaque section 15 has moved past photocell 17 before conveyor 11 is halted. The passing of the opaque section between the light source and the detector momentarily moves switch 43 into engagement with terminal 44 to energize relay coil 46. When switch 35 closes to energize the control system, there will no longer be an opaque section adjacent photocell 17 so that switch 43 moves back into engagement with terminal 45. This energizes relay coil 53 in the manner previously described. However, relay coil 46 remains locked in the energized position so that switch 49 engages terminal 50 instead of terminal 51. This connects motor coil 27a to the power supply in place of coil 27b so that the motor runs in the opposite direction to move tucker bar 25 upwardly. Limit switch 29 terminates upward movement if the upper limit is reached.

In view of the foregoing description, it should be apparent that a simplified control circuit is provided which is capable of actuating equipment to align film properly with respect to containers to be sealed. This circuit uses fewer components than control systems previously known in the art. While the invention has been described in conjunction with a presently preferred embodiment, it should be apparent that it is not limited thereto.

What is claimed is:

1. In apparatus for sealing film to a series of containers which are moved by a conveyor to a sealing station, a film having a series of sensing means thereon in spaced relationship with one another is passed into engagement with the containers, a sealing head is positioned at the sealing station for reciprocal movement toward and away from the conveyor to seal the film to the containers, a detector is positioned so as to be actuated by the sensing means as the film moves past the detector, a tucker bar is carried by the sealing head to engage the film and displace it relative to the containers, and a reversible motor is connected to the tucker bar to move the tucker bar relative to the sealing head, improved apparatus to control the motor comprising:

first, second and third switches;

means to close said first switch when said sealing head is moved toward said conveyor and to open said first switch after said sealing head has moved away from said conveyor;

means to close said second switch momentarily when said sealing head is moved toward said conveyor;

means to close said third switch for a predetermined time interval after the sealing head has moved away from the conveyor;

first and second relays;

a fourth switch actuated by said detector so as to be in a first position when a sensing means is adjacent said detector and to be in a second position when there is no sensing means adjacent said detector;

first circuit means including said first, second and fourth switches to energize said first relay when said fourth switch is in said first position and to energize said second relay when said fourth switch is in said second position;

second circuit means including said first and second relays and said third switch to energize said motor for rotation in a first direction when said third switch is closed, said second relay is energized and said first relay is deenergized; and third circuit means including said first and second relays and said third switch to energize said motor for rotation in a second direction when said third switch is closed, said second relay is energized and said first relay is energized.

2. The apparatus of claim 1, further comprising a first limit switch in said second circuit means to terminate rotation of said motor when said first limit switch is open, a second limit switch in said third circuit means to terminate rotation of said motor when said second limit switch is open, and means responsive to movement of said tucker bar to open said first and second limit switches, respectively, when said tucker bar has moved predetermined distances in first and second directions.

3. In apparatus for sealing film to a series of containers which are moved by a conveyor to a sealing station, a film having a series of sensing means thereon in spaced relationship with one another is passed into engagement with the containers, a sealing head is positioned at the sealing station for reciprocal movement toward and away from the conveyor to seal the film to the containers, a detector is positioned so as to be actuated by the sensing means as the film moves past the detector, a tucker bar is carried by the sealing head to engage the film and displace it relative to the containers, and a reversible motor is connected to the tucker bar to move the tucker bar relative to the sealing head, improved apparatus to control the motor comprising:

first, second and third switches;

means to close said first switch when said sealing head is moved toward said conveyor and to open said first switch after said sealing head has moved away from said conveyor;

means to close said second switch momentarily when said sealing head is moved toward said conveyor;

means to close said third switch for a predetermined time interval after the sealing head has moved away from the conveyor;

first and second terminals adapted to be connected across a current source;

a fourth switch actuated by said detector so as to engage a third terminal when a sensing means is adjacent said detector and to engage a fourth terminal when there is no sensing means adjacent said detector;

a first relay coil actuating fifth and sixth switches, said fifth switch being closed and said sixth switch engaging a fifth terminal when said first relay coil is energized, and said fifth switch being open and said sixth switch engaging a sixth terminal when said first relay coil is deenergized;

a second relay coil actuating seventh and eighth switches, said seventh switch engaging a seventh terminal and said eighth switch being closed when said second relay coil is energized, and said seventh switch engaging an eighth terminal and said eighth switch being open when said second relay coil is deenergized;

circuit means connecting said first and second switches in series between said first terminal and said fourth switch;

circuit means connecting said fifth switch between said third terminal and the junction between said first and second switches;

circuit means connecting said eighth switch between said first terminal and said sixth switch;

circuit means connecting said seventh switch to the junction between said first and second switches;

circuit means connecting said first relay coil between said third terminal and said second terminal;

circuit means connecting said second relay coil between said fourth terminal and said second terminal;

circuit means connecting said seventh terminal to said fourth terminal;

circuit means connecting said eighth terminal to said fourth switch;

said motor having first and second coils, said motor rotating in a first direction when the first coil is energized and in a second direction when the second coil is energized;

first motor drive circuit means connecting the first coil of said motor and said third switch in series relationship between said fifth terminal and said second terminal; and second motor drive circuit means connecting the second coil of said motor and said third switch in series relationship between said sixth terminal and said second terminal.

4. The apparatus of claim 1, further comprising a first limit switch in said first motor drive circuit means, a second limit switch in said second motor drive circuit means, and means responsive to movement of said tucker bar to open said first and second limit switches, respectively, when said tucker bar has moved predetermined distances in first and second directions.

* * * * *